UNITED STATES PATENT OFFICE.

HUGO MOCK, OF NEW BRIGHTON, NEW YORK.

HEAT-INSULATOR.

1,297,583.

Specification of Letters Patent. Patented Mar. 18, 1919.

No Drawing. Application filed April 19, 1917. Serial No. 163,210.

*To all whom it may concern:*

Be it known that I, HUGO MOCK, a citizen of the United States of America, residing at New Brighton, in the county of Richmond and State of New York, have invented certain new and useful Improvements in Heat-Insulators; and I do hereby declare the following to be a full, clear, and exact description of the invention, such as will enable others skilled in the art to which it appertains to make and use the same.

This invention relates to improvements in heat insulators and has more especially for its object the production of a heat insulator of an improved character especially adapted for use in refrigerators, fireless cookers, and similar devices.

I have found that the material known as sulfur or roll sulfur or flowers of sulfur is an excellent non-conductor of heat but when in solid form it is heavy and when in powder form is inconvenient to handle. It therefore became desirable to provide a non-conductor having the non-conducting qualities of sulfur without the above objections.

I do this by melting the sulfur combining same with other materials and converting the combined sulfur and foreign materails into a porous or cellular condition.

For instance, by mixing powdered sulfur with common salt, (chlorid of sodium), in fine particles and melting the mass together, I get a block of sulfur interspersed with particles of sodium chlorid. By subjecting this mass to the action of water, the sodium chlorid is dissolved and I obtain a block of sulfur with interstices of air between same. By graduating the size of the grains of sodium chlorid incorporated with the melted sulfur, I am able to obtain pores of any size in the sulfur block and in this way can secure a sulfur material of any desired weight and porosity.

To secure additional firmness in the texture of a sulfur block, it is at times desirable to add an inert insoluble powder such as magnesium carbonate to the sulfur so that when the sulfur, soluble salt and an inert powder are taken, a finished insulator is obtained having particles of an inert powder such as magnesium carbonate interspersed among the sulfur particles. When the soluble salt is dissolved out, a light and stable heat insulator is produced.

It is also possible to produce a satisfactory insulator by mixing sulfur with a small proportion of gum, resin, wax or similar easily fusible materials with or without the addition of an inert powder and make the compound cellular in the manner above described by mixing same with a soluble salt which is afterward dissolved out or by injecting air into the compound when in a fluid condition.

It will be manifest that many combinations of such insulators can be made but all of same depend for their heat non-conducting qualities on particles of sulfur imprisoning a more or less greater quantity of air.

Where it is desired to produce a non-burnable insulator or an insulator which can with difficulty be burnt, I use a greater proportion of inert material such as magnesium carbonate. Insulators produced according to the above process are sanitary, economical and insect and vermin repellent owing to their sulfur content.

What I claim is:

1. A heat insulator comprising cellular sulfur.

2. A heat insulator comprising the combination of sulfur and an easily fusible material in a cellular condition.

3. A process of preparing an insulator by melting sulfur and converting it into a cellular or porous mass by blowing air into the same.

4. An insulator comprising cellular sulfur containing a small proportion of gum.

5. An insulator comprising cellular sulfur, gum and an inert powder.

In testimony whereof I affix my signature.

HUGO MOCK.